(12) United States Patent  (10) Patent No.: US 6,655,298 B2
Hunt  (45) Date of Patent: Dec. 2, 2003

(54) SKI PARAPHERNALIA CARRYING BASKET FOR A CHAIR SKI LIFT

(76) Inventor: Morris W. Hunt, 5593 Fifteenth Sideroad, R.R. #3, Milton, Ontario (CA), L9T 2C7

( * ) Notice: Subject to any disclaimer, the term of this patent is extended or adjusted under 35 U.S.C. 154(b) by 0 days.

(21) Appl. No.: 10/200,035
(22) Filed: Jul. 22, 2002
(65) Prior Publication Data
US 2003/0116053 A1 Jun. 26, 2003

Related U.S. Application Data
(60) Provisional application No. 60/306,410, filed on Jul. 20, 2001.

(51) Int. Cl.⁷ ................................................. B61B 11/00
(52) U.S. Cl. ............................... 104/173.2; 105/149.2; 248/229.14; 403/256
(58) Field of Search ........................... 104/173.2, 173.1, 104/28, 31, 182, 111, 112; 105/149.2, 149.1; 248/229.14, 229.24, 277.4, 230.5; 403/256, 257, 385, 396, 373; 224/401, 411, 407; 182/14, 36, 144, 150, 193

(56) References Cited
U.S. PATENT DOCUMENTS 4,341,400 A * 7/1982 Morgan ...................... 280/819
4,589,681 A * 5/1986 Erickson ..................... 280/819
4,784,065 A * 11/1988 Brochand ................. 104/173.2
6,575,652 B2 * 6/2003 Krauss .......................... 403/49

* cited by examiner

Primary Examiner—S. Joseph Morano
Assistant Examiner—Frantz F. Jules
(74) Attorney, Agent, or Firm—Cahn & Samuels, LLP

(57) ABSTRACT

An ski paraphernalia basket for use with a chair ski lift having a pivotally moveable safety bar is disclosed. The basket includes a floor suitable for receiving ski paraphernalia, first and second side walls extending upwardly from the floor, and front and rear walls extending upwardly from the floor. The front wall includes an exterior surface having a plurality of inner fastening blocks disposed on thereon. Each inner fastening block includes a recess and each recess is preferably shaped to cradle the safety bar. An outer fastening block is preferably attached to each inner fastening block. Each outer fastening block includes a recess shaped to cradle the safety bar and a sub recess shaped to receive a clamp associated with the safety bar. Accordingly, when the inner fastening block is attached to the outer fastening block the safety bar is nestled securely within the outer fastening block recess and the inner fastening block recess and the clamp is nestled securely in the outer fastening block sub recess and the inner fastening block.

16 Claims, 7 Drawing Sheets

SKI PARAPHERNALIA CARRYING BASKET FOR A CHAIR SKI LIFT

CROSS REFERENCE TO RELATED APPLICATIONS

This application claims priority from provisional application Serial No. 60/306,410 field Jul. 20, 2001, which is hereby incorporated by reference.

FIELD OF THE INVENTION

This invention relates to ski paraphernalia carrying baskets. More particularly, this invention relates to ski paraphernalia carrying baskets having mechanisms for securely mounting same onto chair ski lifts.

DESCRIPTION OF THE PRIOR ART

Downhill skiing, also known as alpine skiing, has become a very popular sport over the past several decades. Typically, downhill skiing involves skiing down lengthy slopes, also known as ski runs, of perhaps several hundred yards long to perhaps about a mile or more long, some of which ski runs are also quite steep in order to allow for expert skiers to obtain considerable speed. Accordingly, ski lifts are provided for carrying skiers from the bottom of the ski runs to the top of the ski runs.

The most common type of ski lift is a chair ski lift having a frame member suspended from a cable, a chair portion mounted on the frame member, and a substantially horizontally disposed elongate safety bar mounted on the chair portion for pivotal movement about a substantially horizontal pivot axis. The safety bar is selectively moveable in an arcuate path between a passenger safety position and an entry-exit position through manual manipulation of an elongate substantially horizontal handle disposed rearwardly of the chair portion. In the passenger safety position, the safety bar is disposed forwardly of an apex balance point and in blocking relation directly in front of the chair portion of the chair ski lift so as to preclude skiers sitting in the chair portion from unintentionally exiting the ski lift before reaching the top of the ski run. In the entry exit position, the safety bar is disposed above and rearwardly of the chair ski lift and rearwardly of the apex balance point, to permit easy ingress and egress of the skier or skiers from the chair.

When ascending a ski hill in a conventional chair ski lift, there is no place for a skier to temporarily set down various ski paraphernalia such as gloves, goggles, hats, and so on. Typically, goggles and hats simply remain in place on the skier's head, with the goggles removed from covering the eyes. However, it is quite common to remove one's gloves so as to wipe or blow the nose. If gloves, or even hats and goggles, are removed while in a chair ski lift, they must either be placed in one's lap, or on the chair portion of the ski lift. As a result, they tend to be dropped during the ascent up the ski run, and possibly not found subsequently. Ski gloves may also be clipped to the skier's jacket, but this is very inconvenient and is generally not done.

At the same time, a new trend in the advertising industry has been to develop new and innovative sites for the placement of revenue producing advertising. In the context of this invention, the term "third party" advertisement contemplates an arms length advertiser that is ordinarily neither the supplier of the invention nor the operator of the chair ski lift on which the invention is employed, although neither is precluded.

Exemplary U.S. Patents that relate to unique advertising include: Boudreau, U.S. Pat. No. 4,928,417, Boudreau, et al., U.S. Pat. No. 4,878,665, Dark, U.S. Pat. No. 5,249,384, Hannon, U.S. Pat. No. 5,190,283, Hageman, U.S. Pat. No. 5,362,044, and Mabie, U.S. Pat. No. 5,788,581. So far as is presently known, there are no issued patents teaching the provision of a device for the storage of ski paraphernalia on a chair ski lift, and almost certainly there are no patents on the placement of removable and replaceable third party paid advertising on such a storage device on a chair ski lift.

In response to the foregoing, the present inventor conceived of and built an advertising ski paraphernalia basket that could be securely mounted to the safety bar of a chair ski lift. The basket is described in Patent Application Publication US 2002/0017542 A1. This is the first device for storing ski paraphernalia on a chair ski lift known to the Inventor. The basket may be used by the skier as a convenient repository for belongings. In addition, the basket is extremely valuable to advertisers. While the chair lift ascends and descends the slope, skiers are a captive audience. Accordingly, advertisers may place advertisements at strategic locations in the basket to maximize exposure to the skiers.

Notwithstanding the advantages provided by the present Inventor's chair ski lift basket, in experimental trials, the inventor observed a problem with the basket in that over time the basket began to rotate relative to the chair ski lift safety bar. This is undesirable as the skiers' belongings may be inadvertently dumped from the basket as the skier ascends and/or descends the slope. It is believed that the basket rotation is due to at least one or more of the following: 1) temperature changes that occur during the ski season, which at most ski resorts extends from November to April, 2) vibration from constant use of the baskets, 3) constant movement of the safety bar, 4) vibration from the chair movement over its travel course and 5) vandalism.

In view of the foregoing, there is a need for an improved ski paraphernalia basket that resists rotation about the chair lift safety bar.

SUMMARY OF THE INVENTION

It is a principal object of the present invention to provide a ski paraphernalia basket for use with a chair ski lift.

It is another object of the present invention to provide an attachment mechanism for securing a ski paraphernalia basket to a ski lift chair.

It is still a further object of the present invention to provide a site for removable and replaceable third party paid advertising in combination with a ski paraphernalia basket for use with a chair ski lift.

It is yet an another object of the present invention to provide a site for removable and replaceable third party paid advertising in combination with a ski paraphernalia basket for use with a chair ski lift, which basket effects dumping of ski paraphernalia inadvertently remaining within the basket, rearwardly of the chair portion of the ski lift when the safety bar is in the entry-exit position.

Various other objects, advantages, and features of the invention will become apparent to those skilled in the art from the following descriptions taken in conjunction with the appended drawings and claims.

The present invention accomplishes the above stated objectives, as well as others, as may be determined by a fair reading and interpretation of the entire specification.

In accordance with a first aspect of the present invention, there is provided a ski paraphernalia basket for a chair ski lift having a pivotally moveable safety bar. The basket includes a floor suitable for receiving ski paraphernalia, first and second side walls extending upwardly from the floor, front and rear walls extending upwardly from the floor, the front wall including an exterior surface, and an attachment device disposed on the front wall. In keeping with the invention, the attachment device has an inner fastening block disposed on the exterior surface which includes a recesses, the recess is configured to cradle the safety bar. The attachment device further includes a hose clamp and an outer fastening block. The outer fastening block has a recess shaped to cradle the safety bar and a sub recess shaped to receive the clamp.

The invention is also be realized by a ski paraphernalia basket and a chair ski lift safety bar, in combination. In accordance with this aspect of the invention, the basket has a floor suitable for receiving ski paraphernalia, first and second sidewalls extending upwardly from the floor, and front and rear walls extending upwardly from the floor. The front wall includes an exterior surface. A chair ski lift safety bar is provided together with an attachment device for securely attaching the basket to the chair ski lift safety bar. The attachment device includes an inner fastening block having a recess disposed on the exterior surface. A hose clamp is preferably disposed about the safety bar and lodged in the recess of the inner fastening block. An outer fastening block is coupled to the inner fastening block, the outer fastening block has a recess that receives the safety bar and a sub recess that houses the hose clamp.

The invention is further realized by a method of attaching a ski paraphernalia basket to a chair lift safety bar. The method includes tightening a hose clamp about the safety bar, aligning the hose clamp with the inner fastening block; and coupling the outer fastening block to the inner fastening block and positioning the hose clamp within the sub recess of the outer fastening block.

DETAILED DESCRIPTION OF THE PREFERRED EMBODIMENTS

Figure 1:
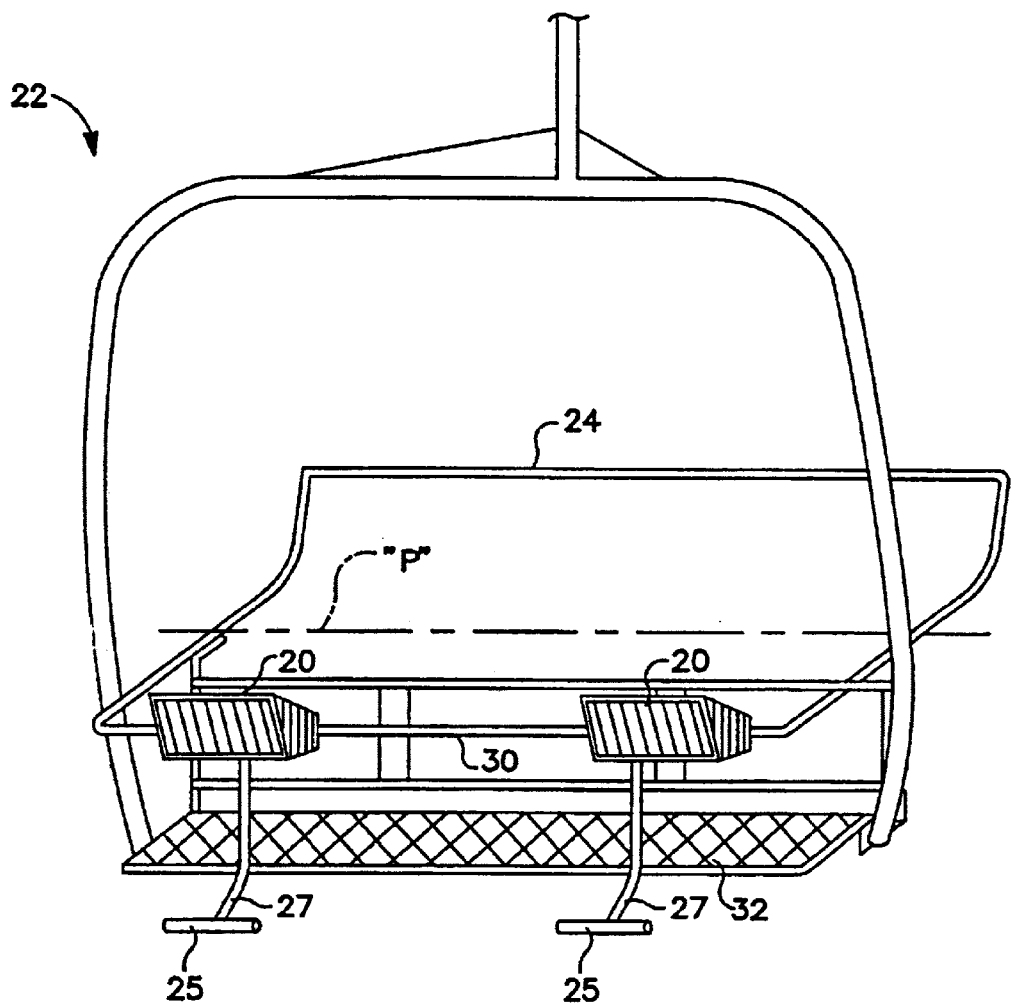
FIG. 1 is a perspective view of a preferred embodiment of the ski paraphernalia basket according to the present invention, installed on a chair ski lift.
Figure 2:
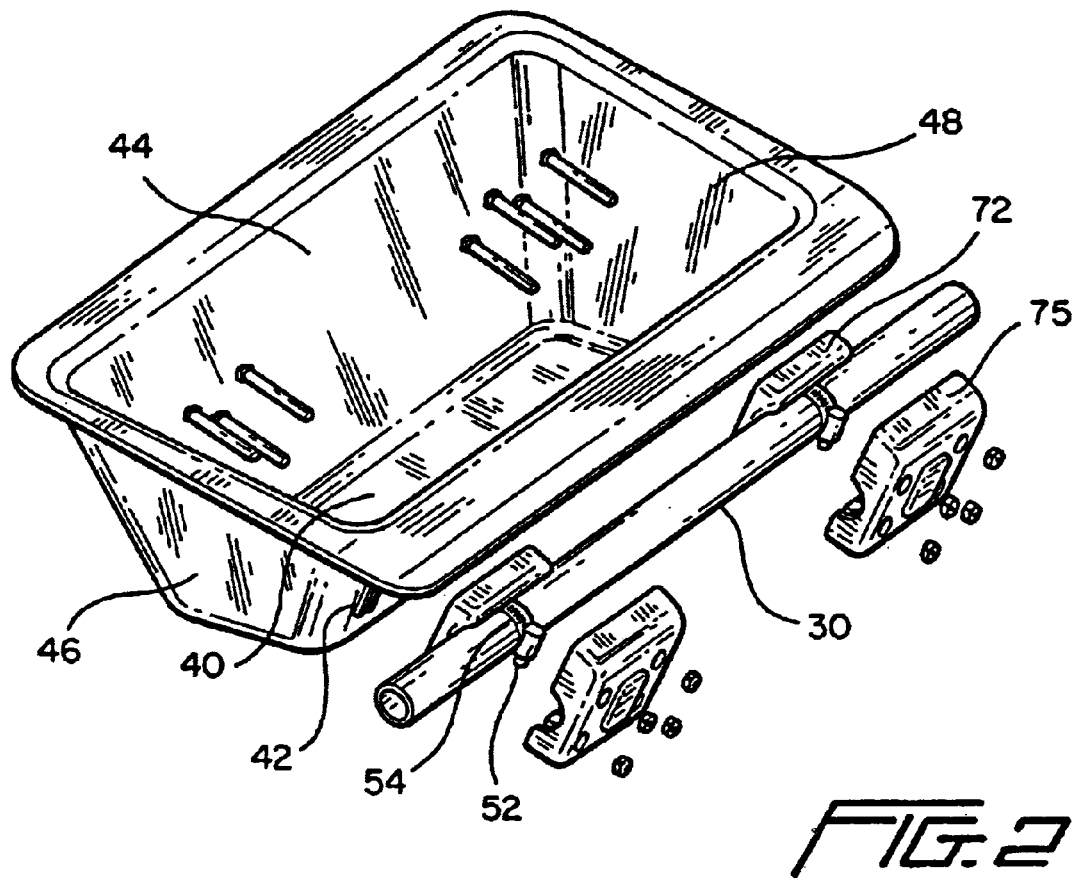
FIG. 2 is an exploded perspective view of the ski paraphernalia basket in accordance with the invention.
Figure 3:
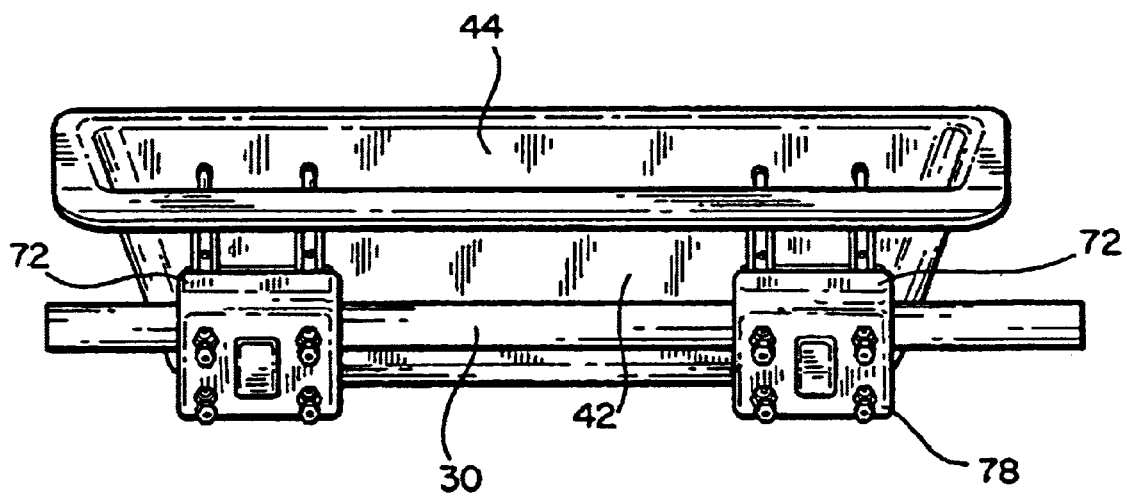
FIG. 3 is a rear elevational view of the ski paraphernalia basket of FIG. 1.
Figure 4:
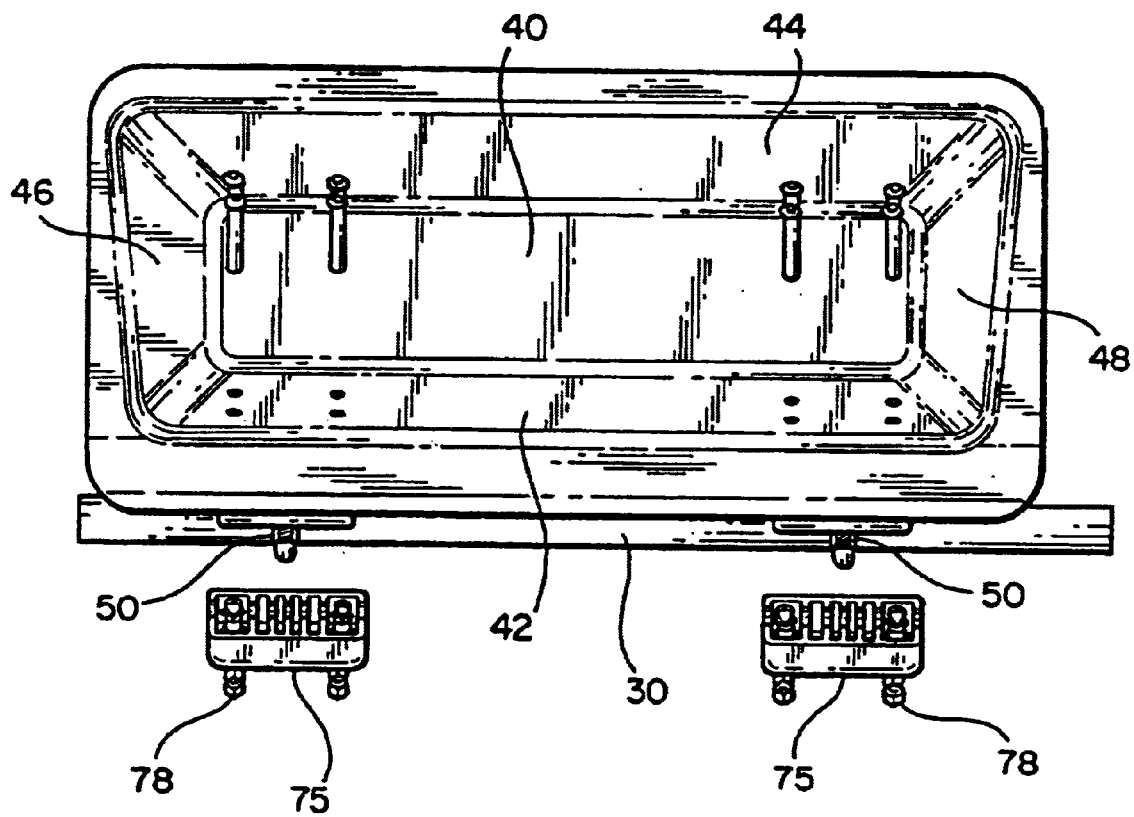
FIG. 4 is a top plan view of the advertising ski paraphernalia basket of FIG. 1.
Figure 5:
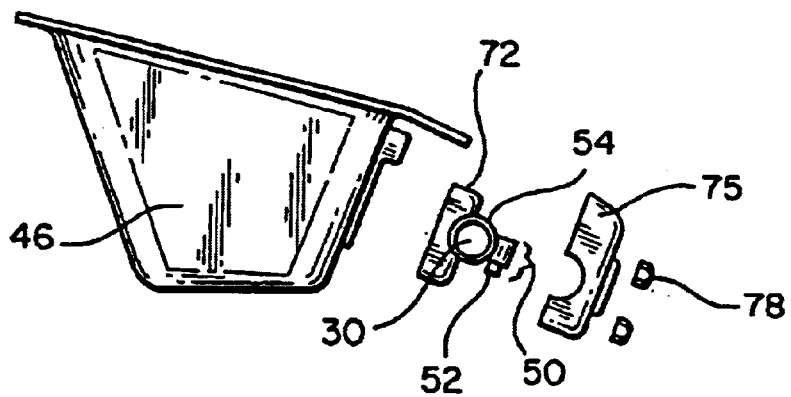
FIG. 5 is a left exploded view of the ski paraphernalia basket of FIG. 1.
Figure 6:
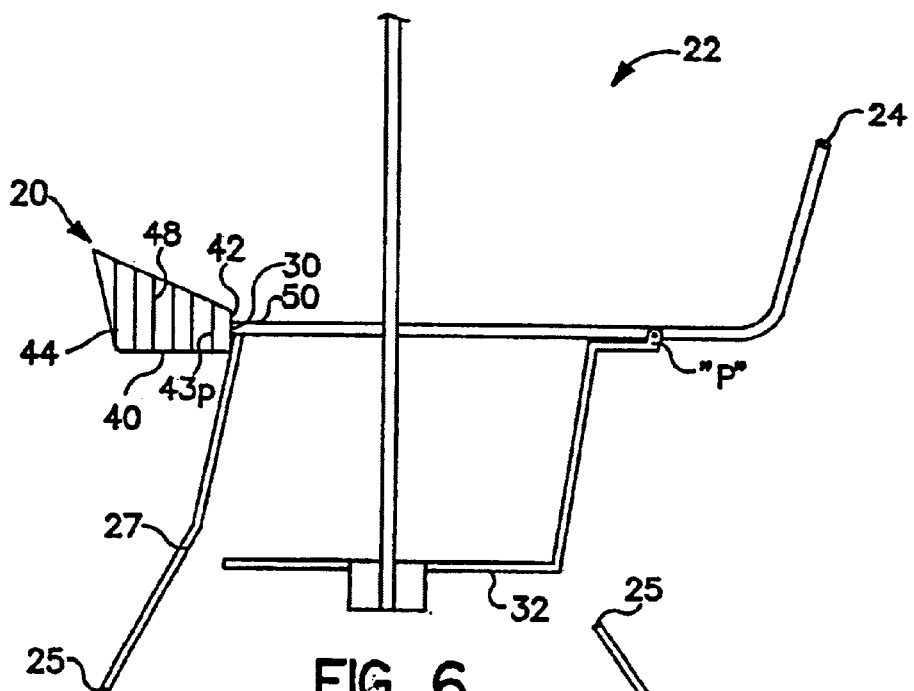
FIG. 6 is a left end elevational view of the ski paraphernalia basket of FIG. 1, installed on a chair ski lift, with the safety bar in its passenger safety position.
Figure 7:
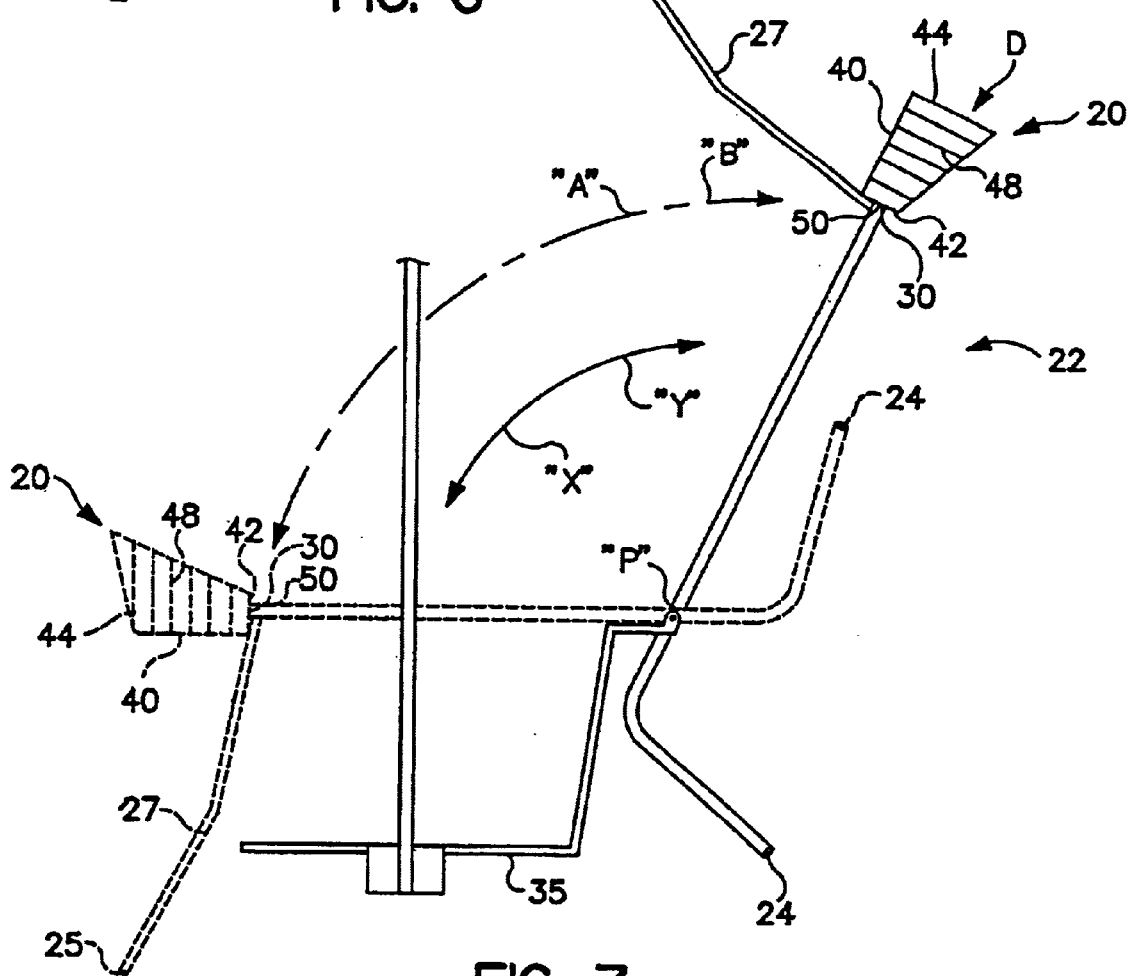
FIG. 7 is a left end elevational view similar to FIG. 6, with the safety bar in its entry-exit position.

Reference will now be made to FIGS. 1 through 13, which show at least one ski paraphernalia basket for carrying ski gloves, goggles, hats and other paraphernalia, while ascending a ski hill in a chair ski lift, as indicated by the general reference numeral 22. The chair ski lift 22 as shown in FIGS. 1, 6, and 7 is part of an overall ski lift apparatus (not shown). Chair ski lifts vary in design, but not significantly. Accordingly, the present discussion is applicable to virtually all chair ski lifts, no matter what specific features of design and geometry they may have.

The ski paraphernalia basket 20 is securely mounted onto a substantially horizontally disposed elongate safety bar 30 of a chair ski lift 22, as can be best seen in FIGS. 1, 6 and 7. The safety bar 30 of the chair ski lift 22 is mounted on the chair portion 32 of the chair ski lift 22 for pivotal movement about a substantially horizontal pivot axis "P" and is selectively manually moveable about the pivot axis "P", as is indicated by arrows "X" and "Y", by manipulation of elongate handle 24, in an arcuate path "A" between a passenger safety position, as illustrated by solid lining in FIG. 6 and by ghost outline in FIG. 7, and an entry-exit position, as illustrated by solid lining in FIG. 7.

In the passenger safety position, the safety bar 30 of the chair lift 22 is disposed forwardly of an apex balance point "B", as can be best seen in FIG. 7, so as to remain in the passenger safety position without having to be latched in position. Also, the safety bar 30 is disposed in blocking relation directly in front of the chair portion 32 of the chair ski lift 22 so as to preclude skiers sitting in the chair portion 32 of the chair ski lift 22 from falling out while ascending a ski hill, before reaching the designated exit point. Typically, when the safety bar 30 is in its passenger safety position, it is also disposed substantially directly in front of its pivot axis "p" so as to permit initial vertical movement and subsequent vertical and rearward movement of the safety bar 30, to thereby not interfere with skiers in the chair lift 22.

In the entry exit position, the safety bar 30 is disposed above and rearwardly of the chair portion 32 of the chair ski lift 22, so as to be out of the way of skiers entering the chair ski lift 22 at the designated entry point at the bottom of the ski run or exiting the chair ski lift 22 at the designated exit point at the top if the ski run. In use, at the bottom of the ski run, the safety bar 30 is in its entry-exit position as it receives skiers for the ascent up the ski run. Once the skiers are seated in the chair portion 32 of the chair ski lift 22, the safety bar 30 is manually moved by a skier from its entry-exit position to its passenger safety position generally, by manipulating the elongate handle bar 24 and remains in the passenger safety position while the chair lift 22 is ascending the ski run. Once at the top of the ski run, the safety bar 30 is manually moved by a skier from its passenger safety position to its entry-exit position again, by manipulating the elongate handle bar 24 and remains in the entry-exit position while the chair lift 22 is descending the ski run.

Further, in the entry-exit position, the safety bar 30 is disposed rearwardly of the apex balance point "B" in order to create a moment about the substantially horizontal pivot axis "P", thus causing the safety bar 30 to be retained by gravity in its entry-exit position, without being latched in position, until it is purposefully moved to its passenger safety position. Preferably, the ski paraphernalia basket 20 is also disposed rearwardly of the apex balance point "B", to augment the moment of the safety bar 30 about the substantially horizontal pivot axis "P", thus assisting the safety bar 30 to remain in its entry-exit position. As can be seen in FIGS. 1, 6, and 7, the ski paraphernalia basket 20 is mounted so as to be disposed forwardly of the safety bar 30 when the safety bar 30 is in its passenger safety position, and is therefore disposed rearwardly of the safety bar 30 when the safety bar 30 is in its entry-exit position, thus further augmenting the moment arm. Accordingly, the safety bar 30 is inherently more stable in its entry-exit position, and is less likely to unintentionally or unexpectedly flip to its passenger safety position during the descent of the chair lift 22 to the elongate handle bar 24, tends to counterbalance the footrest (s) 25 and the support bar(s) 27 therefor, at least a portion of which may be disposed forwardly of the substantially horizontal pivot axis "pit as the chair lift 22 descends the hill.

The basket 20 comprises a substantially flat floor 40 suitable for receiving ski paraphernalia, a front wall 42, a rear wall 44 that is sloped to squarely face a skier in the chair lift, a left side wall 46, and a right side wall 48. The front, rear, left side, and right side walls 42, 44, 46, 48 are joined one to another and extend upwardly about the periphery of the floor 40. In the preferred embodiment, the front wall 42 is shorter than the rear wall 44 to permit ready access to ski paraphernalia retained in the basket 20 and to facilitate viewing by skiers in the chair lift of the advertising or other indicia 52 on the sloped rear wall 44. Rear wall 44 is preferably angled about 18° from a perpendicular bisector of flat floor 40. The top edge of left and right side walls 46, 48 are accordingly also sloped downwardly from rear to front.

In preferred embodiments the dimensions and geometry of basket 20 are as follows. Basket 20 may be 17½ inches long by 7 inches wide (interior dimension), and 19 inches long by 9⅞ inches wide (exterior dimension). Basket 20 may have a depth of 3⅞ inches on the side facing chair ski lift 22 and 5 inches on the side disposed farthest from chair ski lift 22.

In the preferred embodiment as illustrated, the floor 40 and the front, rear, left side, and right side walls 42, 44, 46, 48 may be made from a material suitable for use in low temperature applications. A preferred material is plastic. An alternate material may be a wire mesh coated with a suitable plastic or synthetic rubber. In preferred embodiments, the basket is comprised of a stable, durable, flexible and UV stabilized plastic material suitable for temperatures as low as minus 50 degrees Fahrenheit, e.g., Nylene Mega Tough PX 3422 HS UV BK.

In accordance with an aspect of the invention, one or more of the floor 40 and the front, rear, left side, and right side walls 42, 44, 46, 48 may have a plurality of openings 48a therein to accommodate snow and water drainage. The openings also help to minimize wind resistance, so as to substantially preclude the possibility of the wind blowing against the basket 20 strongly enough to unexpectedly move the safety bar 30 from either of its passenger safety position or its entry-exit position.

In accordance with a particularly preferred aspect of the invention, only the floor 40 and the left side and right side walls 46 and 48 are provided with openings 48a. Front and rear walls 42 and 44 are preferably solid and opaque.

Further in keeping with the invention, to address the problem of basket 20 rotating/slipping relative to safety bar 30, basket 20 is provided with an improved attachment mechanism. The improved attachment mechanism is shown, for example, in FIGS. 2 and 5. The attachment mechanism of the present invention preferably comprises inner and outer fastening blocks 72 and 75 respectively, and a hose clamp 50 sandwiched between inner and outer fastening blocks 72 and 75.

Figure 10:
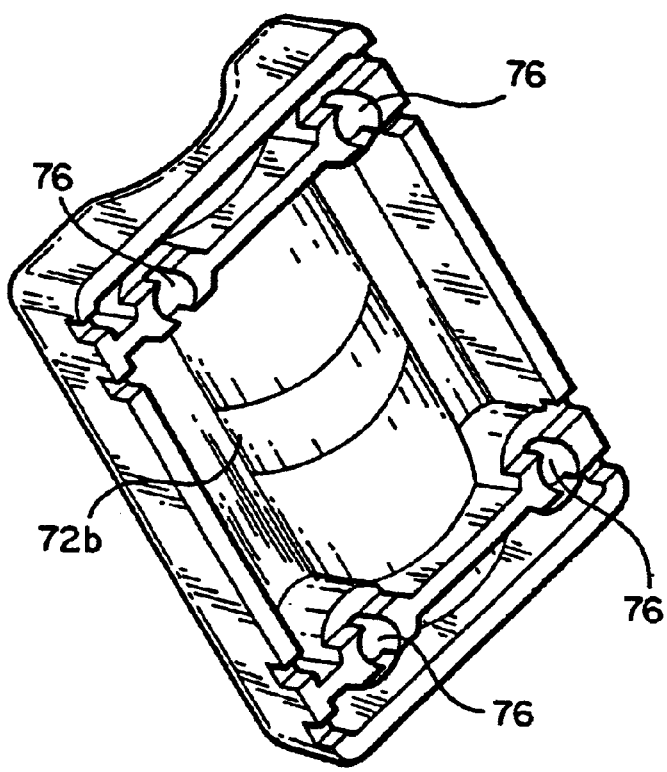
FIG. 10 is a perspective view of the inner fastening block in accordance with the invention.
Figure 11:
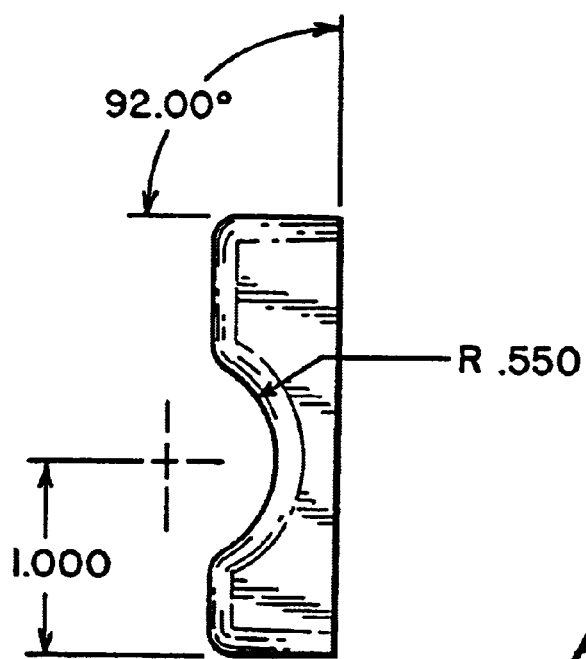
FIG. 11 is a side view of the inner fastening block in accordance with the invention.

As illustrated, front wall 42 includes an exterior surface having a plurality of inner fastening blocks 72 preferably fixedly attached thereto or integrally formed therewith. As shown in FIGS. 10 and 11, each inner fastening block 72 preferably includes a recess 72a configured to cradle a portion of the outer surface of safety bar 30. Recess 72a is preferably circular in cross section and preferably has a radius of about 0.55 inches. In some embodiments, recess 72a may include a groove 72b for matingly engaging hose clamp 50.

In keeping with the invention, each attachment mechanism further includes a size adjustable strap clamp 50. Preferably, adjustable strap clamp 50 is of the type typically employed in the art and includes an adjustment screw 52 and a strap 54. More preferably, adjustable strap clamp 50 may be a Series 850, size 175, Trimax stainless steel clamp. Adjustment screw 52 is preferably a 5/16 inch diameter type 410 hex head stainless steel screw. The strap may be tightened or loosened with adjustment screw 52. Adjustable strap clamp 50 preferably has a coefficient of thermal expansion substantially identical to that of safety bar 30.

Figure 12:
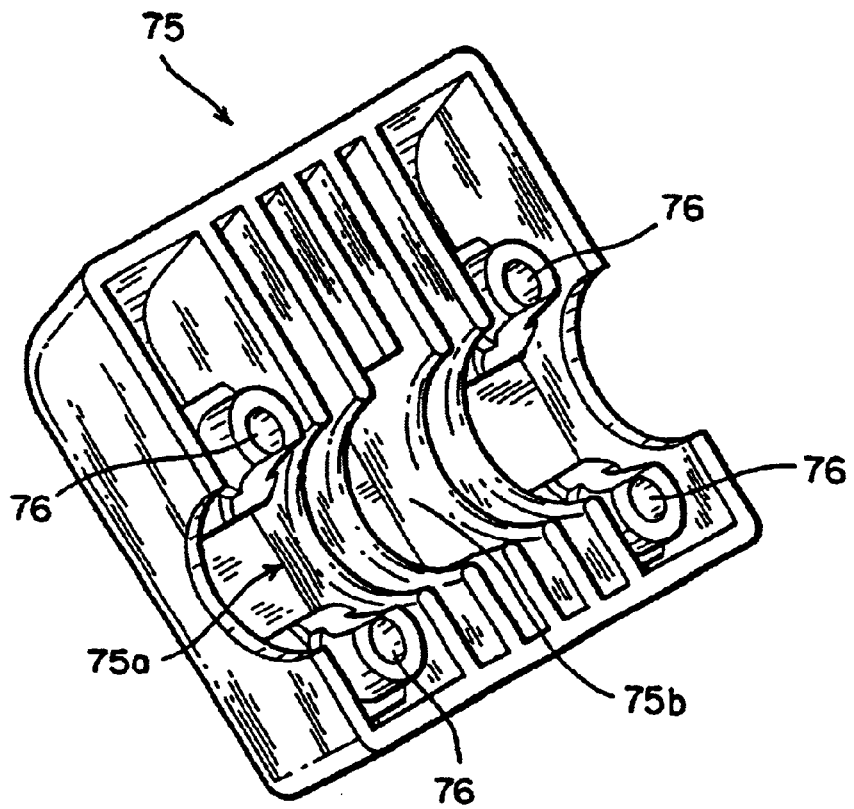
FIG. 12 is a perspective view of the outer fastening block in accordance with the invention.
Figure 13:
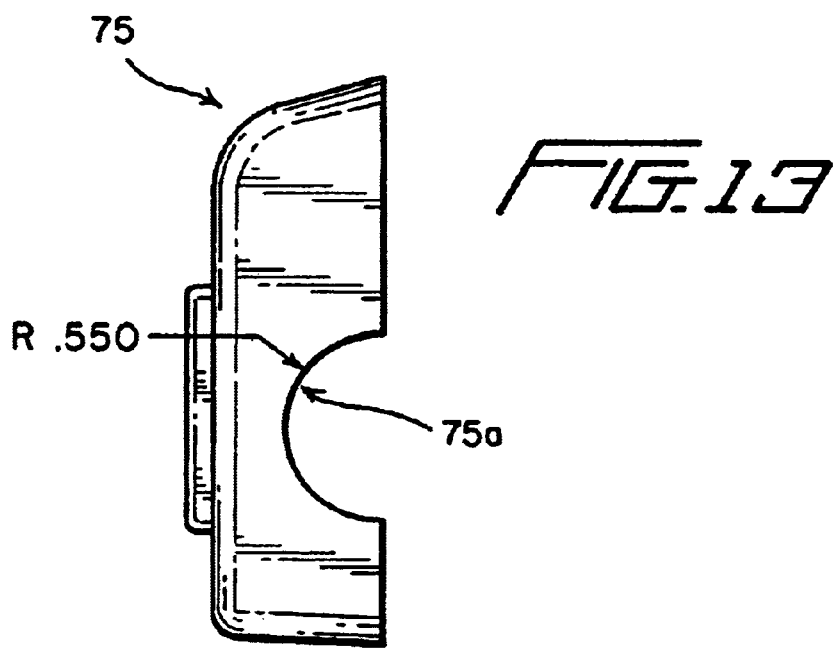
FIG. 13 is a side of the outer fastening block in accordance with the invention.

Outer fastening block 75 is preferably attached to inner fastening block 72a such that strap clamp 50 and safety bar 30 are sandwiched therebetween. In keeping with the invention, as depicted in FIGS. 12 and 13, each outer fastening block 75 includes a recess 75a shaped to cradle a portion of safety bar 30. Each recess 75a further includes a sub recess 75b dimensioned to snuggly receive adjustment screw 52 such that when outer fastening block 75 is attached to inner fastening block 72, adjustment screw 52 abuts against sub recess 75b thus preventing unwanted movement or rotation of basket 20 relative to safety bar 30.

In order to install basket 20 to chair ski lift 22, hose clamp 50 should be tightened around safety bar 30 and matingly engaged with inner fastening block 72. Preferably, hose clamp 50 should be torqued to about 150 inch-pounds. By torquing hose clamp 50 as prescribed it will be substantially unaffected by temperatures and vibration since the coefficient of thermal expansion of hose clamp 50 and that of safety bar 30 are practically the same.

Outer fastening block 75 is then secured to inner fastening block 72 thus creating a secure clamping connection with safety bar 30. To facilitate attachment of inner fastening block 72 to outer fastening block 75, inner and outer fastening blocks 72 and 75 are each provided with screw holes 76. When attaching inner fastening block 72 to outer fastening block 75, the basket installer should align screw holes 76 and thread with attachment bolts 78. Attachment bolts 78 should be torqued to about 75 inch-pounds. Although the bolted plastic fastening block my loosen, no appreciable movement of basket 20 relative to safety bar 30 will occur due to the nestled relationship between adjustment screw 52 of hose clamp 50 and inner and outer fastening clamps 72 and 75.

As can best be seen in FIG. 6, when the safety bar 30 is in its passenger safety position, the carrying basket 20 is positioned so as to be readily accessible, yet in non-blocking relation to passengers in the chair portion 32 of the chair ski lift 22. Also, the floor 40 and front, rear, left side, and right side walls 42, 44, 46, 48 of the basket 20 are in a ski paraphernalia supporting orientation, preferably substantially horizontally oriented, thus permitting ski paraphernalia, such as ski gloves, goggles, hats, and so on, to be retained therein during the ride while a skier is ascending a ski hill in a chair ski lift 22.

When the safety bar 30 moves in the arcuate path "A" from the passenger safety position toward its entry-exit position, as indicated by arrow "Y" in FIG. 7, past the apex balance point "B", the basket 20 reaches a dumping position, as indicated by arrow "D" in FIG. 7. The dumping position "D" may be reached either before the entry-exit position of the safety bar 30 or at the entry-exit position of the safety bar 30. In the dumping position, the floor 40 and the front, rear, left side, and right side walls 42, 44, 46, 48 of the basket 20 are removed from their ski paraphernalia supporting orientation. Further, the floor 40 of the basket 20 is substantially inverted, thus causing any ski paraphernalia inadvertently remaining within the basket 20, to be dumped from basket 20 onto the ground below the chair ski lift 22. In this manner, the dumped ski paraphernalia may be immediately recovered, instead of being retained in the basket and probably not recovered.

It is undesirable to dump any ski paraphernalia inadvertently remaining within the basket 20 onto the skiers in the chair portion 32 of the chair ski lift 22, as this would be quite startling. Moreover, in the event that a hard or somewhat heavy object remains in the basket 20, injury could result.

It can be seen and understood by way of the above description and accompanying drawings that the ski paraphernalia basket 20 of the present invention provides a ski paraphernalia basket 20 for use with a chair ski lift 22, which basket 20 is connected to the safety bar 30 of a chair ski lift 22 and is unobtrusive during use of a chair ski lift 22, including during entry into and exit from a chair ski lift 22. The ski paraphernalia basket 20 of the present invention also effects dumping rearwardly of the chair portion 32 of the ski lift of any ski paraphernalia inadvertently remaining within the baskets 20.

Figure 8:
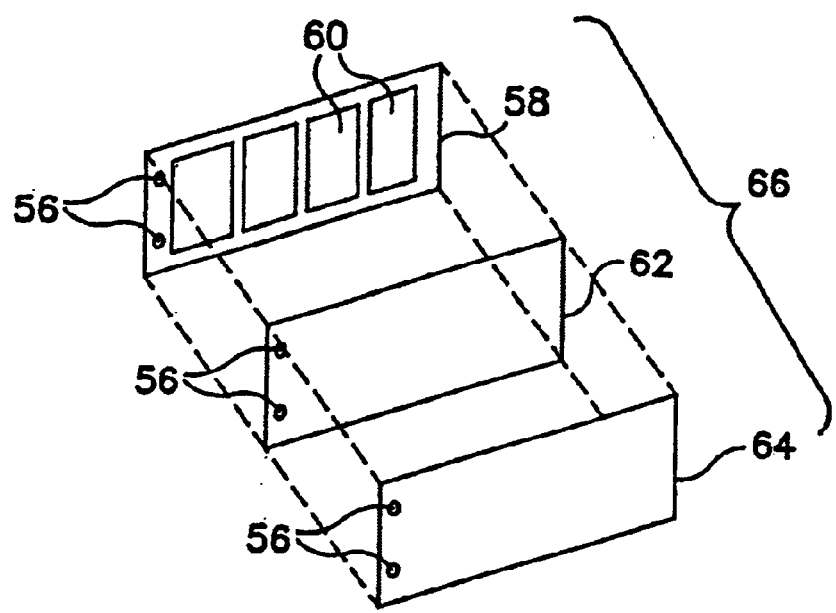
FIG. 8 is an exploded view of the third party paid advertising laminate prior to lamination.

Turning to FIG. 8, there is illustrated an exploded perspective view of an exemplary advertising laminate 66. It is composed of three layers beginning with advertisement substrate 58 on to which has been preferably placed anywhere from 1 to 4 advertisements. This is preferably done with computer generated advertising plates that are printed and produced using a high-resolution laser output on 10-point opaque polyolefin plastic film. The second layer is sided adhesive film 62. The third layer protective layer 64, which is preferably comprised of 30-point polycarbonate. These three layers are laminated together by passing them through a conventional laminating unit (not shown). The product is also die cut to finished size (not shown) and drilled with fastener holes 56.

Figure 9:
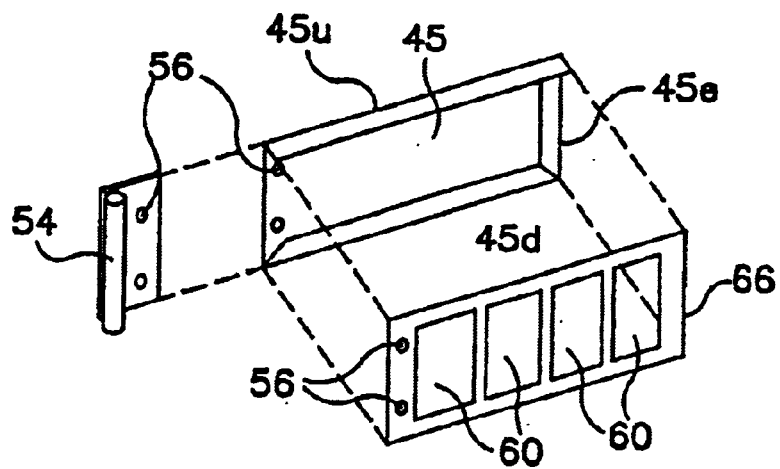
FIG. 9 is an exploded view of the laminated advertising prior to assembly to the sight-blocking panel.

FIG. 9 is an exploded perspective view illustrating how the advertising laminate 66 is assembled to the rear sight-blocking panel 45. The rear sight blocking includes an upper lip 45u, lower lip 45l and side lip 45s. The advertising laminate is placed on the surface-blocking panel 45 within the foregoing lips and with fastener holes 56 in registration with similar fastener holes 56 previously placed in rear sight blocking panel 45. Then end cap 54, which also has fastener holes 56, is attached to the foregoing, and conventional fasteners such as rivets or screws (not shown) are used to connect to the entire assembly together for placement in the basket.

It is apparent that the foregoing assembly can readily disassembled without even removing the sight blocking panel 45 from the basket for the purpose of removing and replacing the advertising copy 60 on a regular basis.

While the invention has been described, disclosed, illustrated and shown in various terms or certain embodiments or modifications which it has assumed in practice, scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A ski paraphernalia basket for a chair ski lift having a pivotally moveable safety bar, said basket comprising:
   a floor suitable for receiving ski paraphernalia;
   first and second side walls extending upwardly from the floor;
   front and rear walls extending upwardly from the floor, the front wall including an exterior surface; and
   an attachment device disposed on the front wall, said attachment device including:
      an inner fastening block disposed on the exterior surface, each inner fastening block including a recesses, wherein the recess is configured to cradle the safety bar;
      a hose clamp; and
      an outer fastening block having a recess shaped to cradle the safety bar and a sub recess shaped to receive the clamp.

2. The ski paraphernalia basket of claim 1 wherein said inner fastening block includes a groove configured to receive the hose clamp.

3. The ski paraphernalia basket of claim 2 wherein said hose clamp includes an adjustment screw and a band and the groove of inner fastening block is configured to receive the band.

4. The ski paraphernalia basket of claim 3 wherein the sub recess of said outer fastening block is configured to matingly engage said adjustment screw.

5. The ski paraphernalia basket of claim 1 wherein said inner fastening block is integrally formed with said front wall.

6. The ski paraphernalia basket of claim 1 wherein said inner fastening block is removably attached to said front wall.

7. The ski paraphernalia basket of claim 1 wherein said hose clamp includes an adjustment screw and the sub recess of said outer fastening block is slightly larger than the adjustment screw.

8. In combination, a ski paraphernalia basket and a chair ski lift safety bar comprising:
   a basket having a floor suitable for receiving ski paraphernalia, first and second side walls extending upwardly from the floor, front and rear walls extending upwardly from the floor, the front wall including an exterior surface;
   a chair ski lift safety bar; and
   an attachment device for securely attaching said basket to said chair ski lift safety bar, said attachment device comprising:
      an inner fastening block disposed on the exterior surface, the inner fastening block including a recess;
      a hose clamp disposed about the safety bar and lodged in the recess of the inner fastening block; and
      an outer fastening block coupled to the inner fastening block, the outer fastening block having a recess that receives the safety bar and having a sub recess, the hose clamp being disposed in the sub recess.

9. The combination of claim 8 wherein the clamp includes an adjustable screw and a band and wherein the inner fastening block includes a groove and the band is matingly engaged with the groove.

10. The combination of claim 9 wherein the adjustable screw is disposed in the sub recess of said outer fastening block such that the screw abuts the periphery of the sub recess.

11. The combination of claim 8 wherein said clamp and said safety bar have substantially identical coefficients of thermal expansion.

12. The combination of claim 8 wherein said inner fastening block is integrally formed with said basket.

13. The combination of claim 8 wherein said inner fastening block is removably attached to said basket.

14. A method of attaching a ski paraphernalia basket to a chair lift safety bar comprising:

tightening a hose clamp about the safety bar;

aligning the hose clamp with an inner fastening block;

coupling an outer fastening block to said inner fastening block and positioning the hose clamp within a sub recess of the outer fastening block.

15. The method of claim 14 wherein coupling the outer fastening block to the inner fastening block includes bolting the outer fastening block to the inner fastening block with 75 inch-pounds of torquing force.

16. The method of claim 14 wherein tightening the hose clamp about the safety bare includes applying a 150 inch-pound torquing force to the hose clamp.

* * * * *